Dec. 13, 1927. 1,652,710
A. J. DOTTERWEICH
APPARATUS FOR SOFTENING WATER
Filed March 19 1926 5 Sheets-Sheet 2
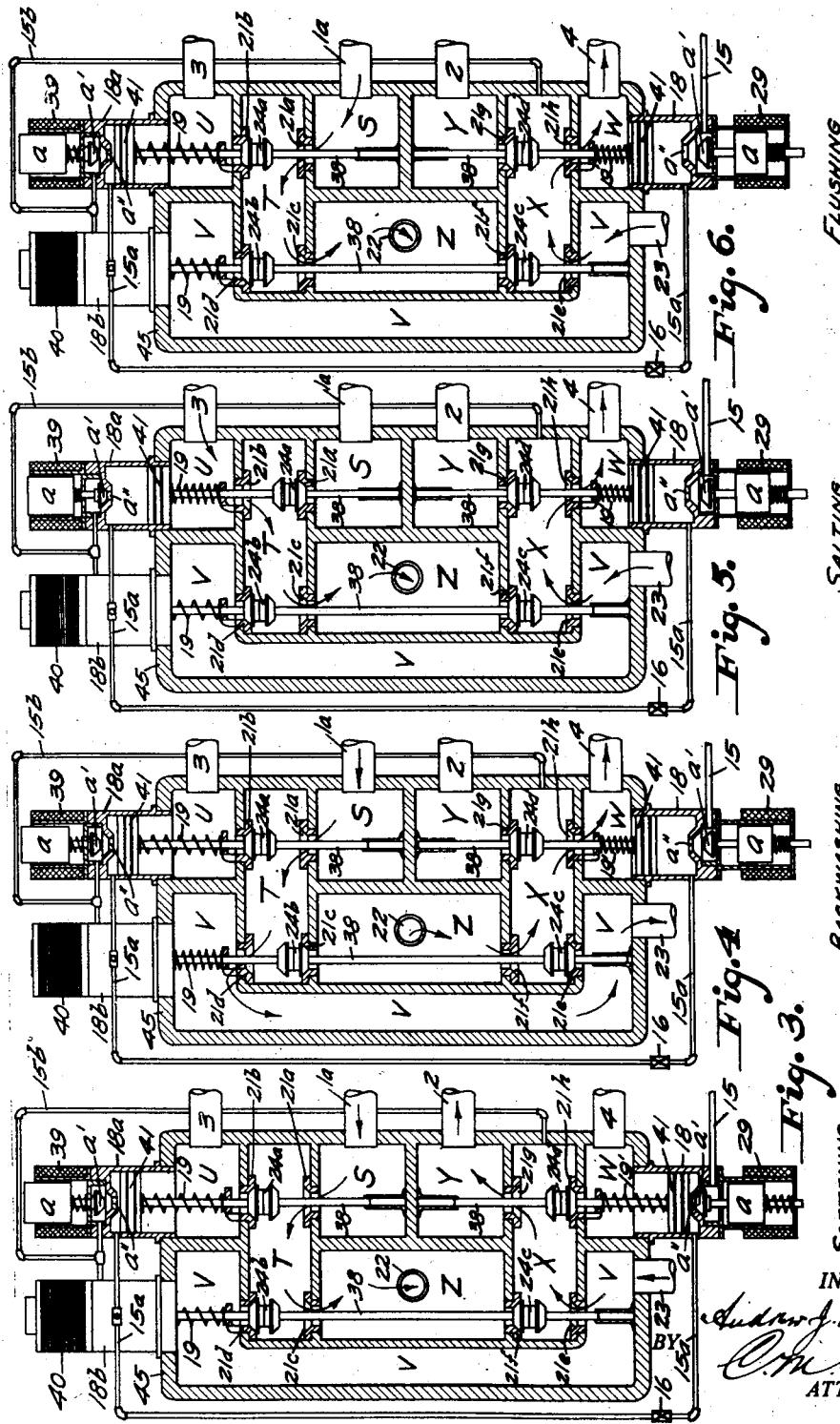
INVENTOR.
Andrew J. Dotterweich
BY
ATTORNEY Dec. 13, 1927.
A. J. DOTTERWEICH
1,652,710
APPARATUS FOR SOFTENING WATER
Filed March 19, 1926    5 Sheets-Sheet 3
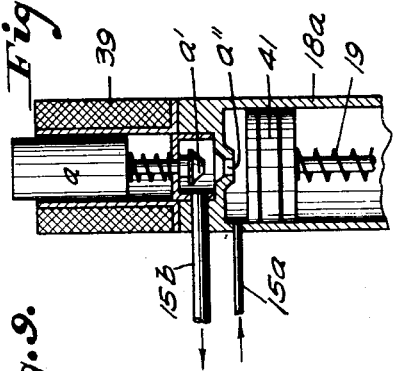
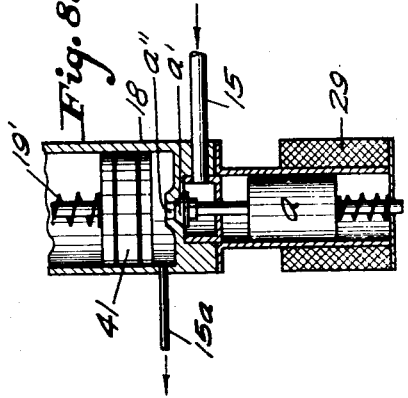
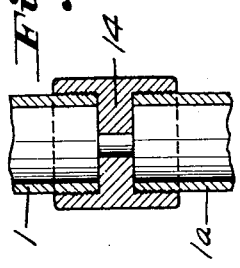
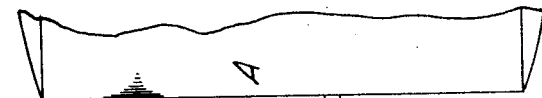
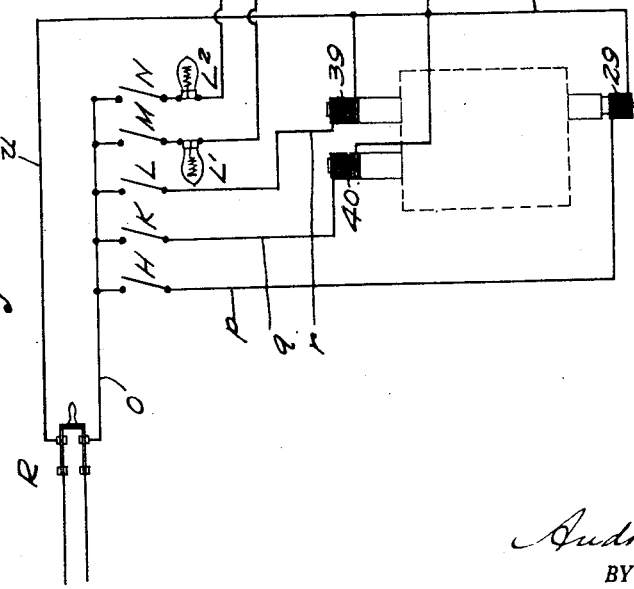
INVENTOR.
Andrew J. Dotterweich
BY
C. M. Clarke
ATTORNEY

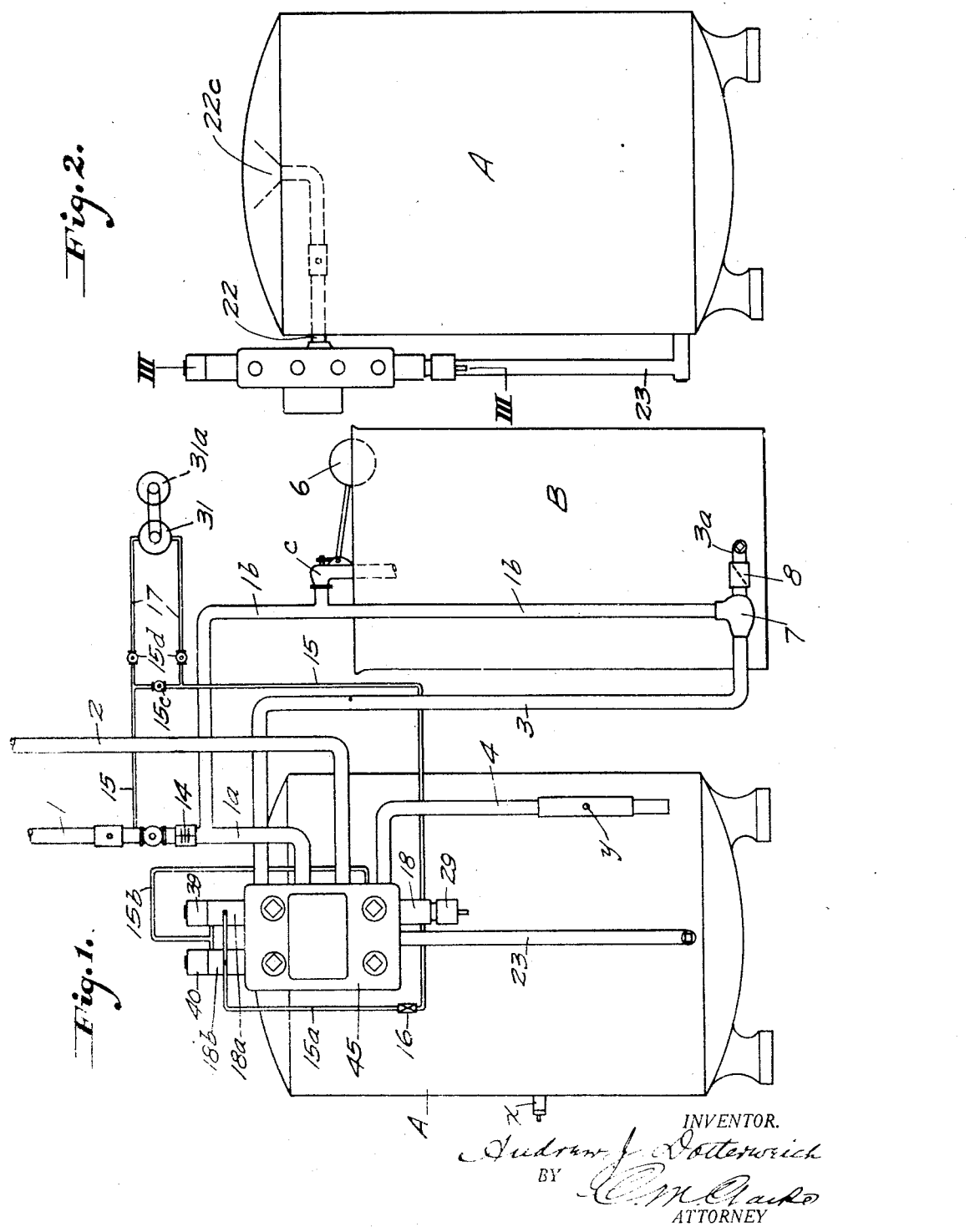

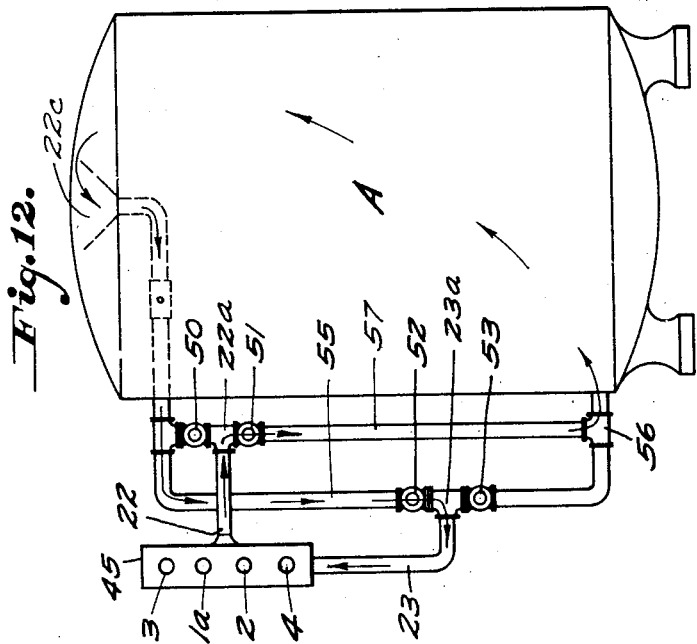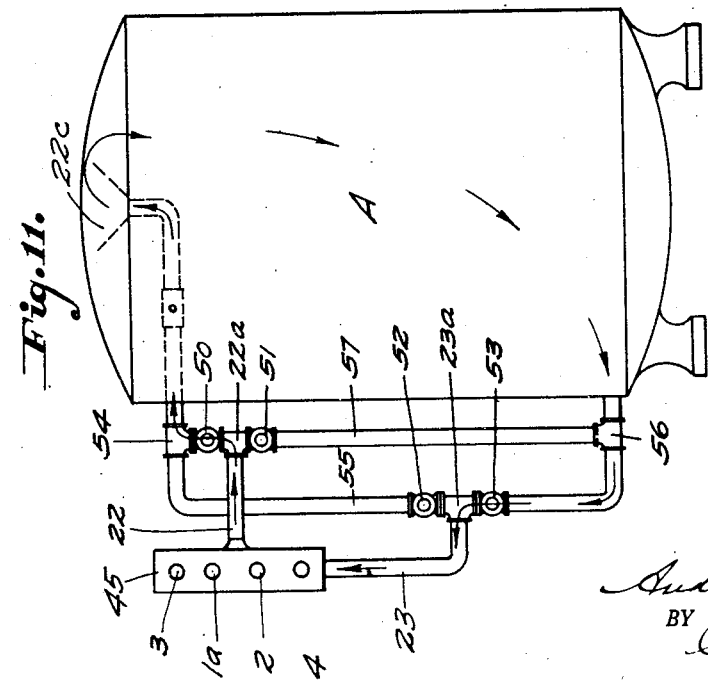

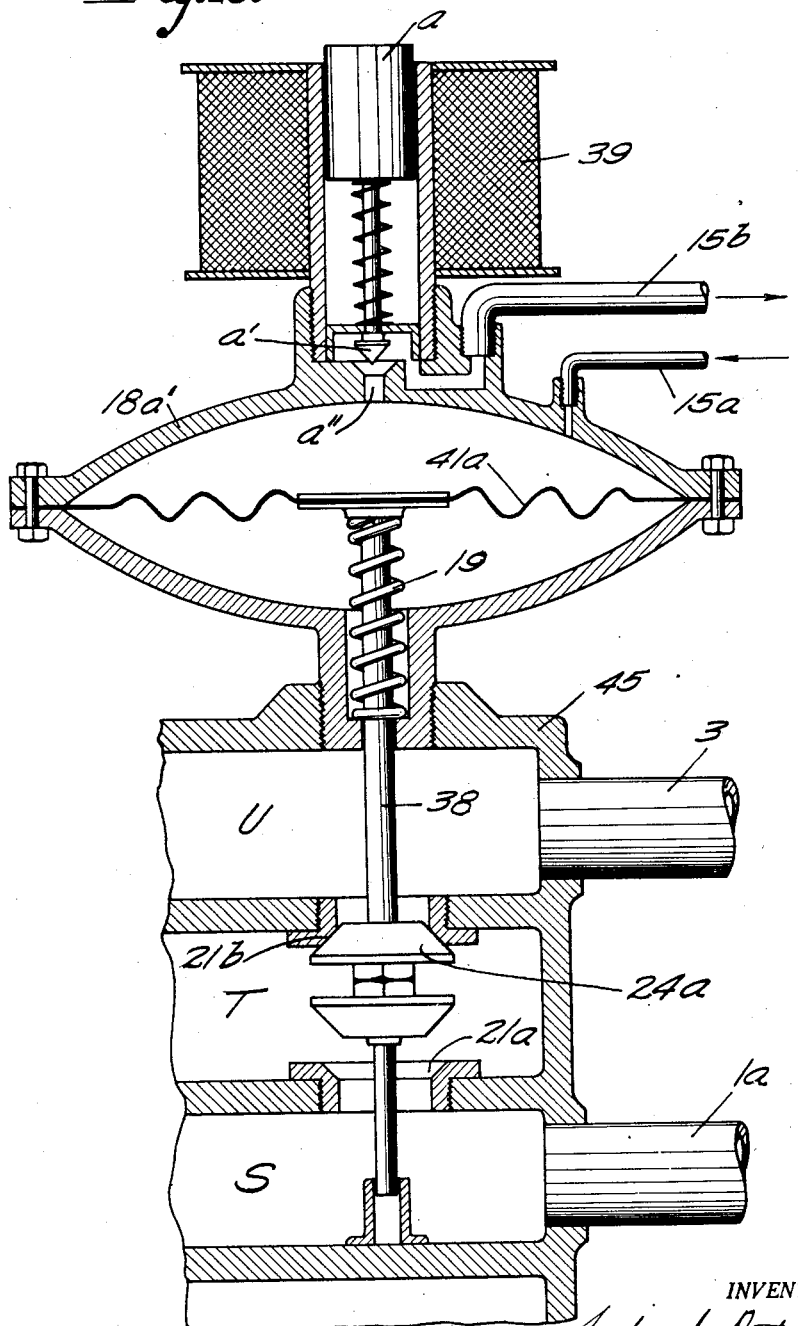

Patented Dec. 13, 1927.

1,652,710

UNITED STATES PATENT OFFICE.

ANDREW J. DOTTERWEICH, OF PITTSBURGH, PENNSYLVANIA.

APPARATUS FOR SOFTENING WATER.

Application filed March 19, 1926. Serial No. 95,872.

My invention refers to improvements in apparatus for softening water and especially to that type utilizing a material such as zeolite capable of being regenerated.

The improvement herein involved refers particularly to a valve chamber and valve mechanism therein for controlling the circulation of the raw water, brine water, and softened water successively, in carrying out the successive steps of softening, back-washing, salting and flushing.

Means are provided for effecting the desired circulation through the operation of electrically controlled magnetically actuated valves for effecting the various changes in circulation in due sequence and in a simple, expeditious and economical manner.

The present invention is an improvement in that class of mechanism disclosed in my prior applications, Serial Nos. 31,313 and 91,939.

In the present invention, I use electrically actuated valves for establishing the several desired circulations with automatically operative circuit opening and closing means dependent on the circulation of the liquid, with attendant manually operative opening and closing switches, as hereinafter described.

Certain preferred embodiments of the invention are shown in the accompanying drawings in which:

Fig. 1 is a view in front elevation of a water softening apparatus embodying the invention;

Fig. 2 is a view in side elevation of the water softening tank and circulating connections.

Figs. 3, 4, 5 and 6 are enlarged vertical sectional views on the line III, III, of Fig. 2 showing the valve chamber and its circulating valve-seated ports and valves in the several operative positions for softening, back-washing, salting and flushing respectively.

Fig. 7 is an enlarged sectional detail view of the valve mechanism of one of the upper magnets.

Fig. 8 is a similar view of the valve mechanism of the lower magnet.

Fig. 9 is a similar view of the choke nozzle.

Fig. 10 is a diagrammatic view of the circuits for the several valve actuating magnets.

Figs. 11 and 12 are diagrammatic views showing a modified arrangement of piping between the valve box and softening tank illustrating reverse circulations.

Fig. 13 is an enlarged vertical sectional view showing diaphragm-actuated valve mechanism.

The ordinary flow of hard water for softening is downwardly through the softening tank under normal pressure of the main, as the water is drawn from the delivery pipe system, except where a reverse or upward circulation is effected by use of the modified system of piping shown in Figs. 11 and 12.

The operations of (c) and (d) reflushing are effected by downward circulation through the zeolite for limited periods, under the control of circulation regulating valves which are actuated by solenoid magnets.

These are energized by circuits which are closed primarily by a positively established switch-controlled circuit, and kept open sufficiently long to effect flow of raw water through the brine tank, and thence into the softening chamber, for regeneration.

Thereafter the circulation of raw water for softening, with the incident of back-washing, is accomplished in the usual way.

Referring to the drawings, A is the softening tank located in convenient relation to the brine tank B for direct connection and circulation through the connecting pipe and valve system shown.

Brine tank B is open at the top for introduction of salt from time to time, and has a direct water supply branch pipe having a cut-off valve $c$ controlled by the usual float 6, for closing when the tank is normally filled. A branch connection $1^b$ leads through ejector 7 and pipe 3 to the valve box 45 for controlled circulation therethrough.

Tank B has an outlet at $3^a$ through check valve 8 into ejector 7, check valve 8 acting to prevent raw water from backflowing into the brine tank.

The ejector 7 is actuated by main line $1^a$ and feeds by line 3 into chamber U of the valve box 45, mounted adjacent the softening tank A. Valve box 45 is provided with partitions arranged horizontally and vertically, forming the series of chambers S, T, U, V, W, X, Y and Z.

Main supply line $1^a$ feeds raw water to chamber S of the valve box, and a soft water delivery pipe 2 leads from chamber Y thereof for supply. Pipe 23 connects the bottom of the softening tank A with chamber V of the valve box, and a drain pipe 4 leads from chamber W thereof, for waste.

Valve seated ports $21^a$, $21^b$, $21^c$, $21^d$, $21^e$, $21^f$, $21^g$ and $21^h$, connect the several chambers, with double faced valves $24^a$, $24^b$, $24^c$, and $24^d$ operating thereon. Said valves are arranged to seat upwardly and downwardly by their several stems 38, each having a plunger or piston head 41 in a cylinder 18, $18^a$ and $18^b$, respectively. Each cylinder is provided with a solenoid magnet 29, 39 and 40 respectively and an enclosed armature $a$, of usual construction.

The valve $24^d$ for port $21^h$ normally seats on port $21^h$ by action of gravity and spring $19'$, while valves $24^a$, $24^b$ and $24^c$ for ports $21^b$, $21^d$, and $21^f$ are normally seated upwardly by springs 19 as shown. Each armature $a$ is provided with a valve stem and valve $a'$ controlling water pressure through a port $a''$ leading to the plunger 41. When port $a''$ is closed pressure from pipe $15^a$ acts on the plunger, and when the port is open, as in Fig. 7 the circulation passes to pipe $15^b$ without acting on the plunger.

For the purpose of providing pressure for actuation of the several plungers and their circulation controlling valves, a high pressure line 15 is connected with main raw water pipe 1 and leads to the casing 18 below the valve controlled port $a''$, controlling pressure to the lower plunger 41 of valve $24^d$.

A similar pipe $15^a$ leads from the other side of the valve port $a''$ through check valve 16 up to the plunger casing $18^a$ and $18^b$ respectively, for supplying pressure for plungers 41 therein, to actuate valves $24^a$ and $24^b$.

The purpose of check valve 16 is to close off any back flow of liquid through pipe $15^a$ from either cylinder $18^a$ or $18^b$ due to leakage around pistons 41. Should any such leakage pass back into the lower cylinder 18 it would tend to build up a pressure therein and effect undesired movement to raise valve $24^d$.

The circulation between the plunger casing and the upper valve-controlled port being opened and closed by the solenoid actuated valve $a'$ of magnet 39 and 40 respectively, a similar pipe $15^b$ is connected by branch connections to each of the valves, so that when the valve $a'$ is open, circulation will pass freely therethrough without action on either plunger.

When, however, one or the other or both of said valves are closed, as in Fig. 5, pressure from pipe $15^a$ will actuate plunger 41 and close the circulation port $21^a$, $21^c$ and $21^e$, if magnet 29 is energized to lower its valve $a'$.

As shown in detail in Fig. 8 the inlet pipe 15 to casing 18 is considerably larger than its outlet pipe $15^a$ so as to ensure effective pressure on piston 41 when valve $a'$ is open, because of retarded exhaust through pipe $15^a$, building up pressure in cylinder 18.

On the contrary, as to casings $18^a$ and $18^b$, Fig. 7, the inlet from pipe $15^a$ below port $a''$ is relatively smaller than the outlet by pipe connections of line $15^b$ so as to relieve pressure on piston 41 when valve $a'$ is open, for free circulation without depressing the pistons 41.

Pipe $15^b$ is connected with chamber X by which circulation may pass with the main current to waste pipe 4, dependent on port $21^h$ being open, as in Figs. 4, 5 and 6.

Line 15 is of comparatively small size and is provided with controlling valve $15^c$ with by-pass pipe 17, leading through a pump 31 actuated by driving motor $31^a$.

Pipes 17 are also provided with valves $15^d$ by which the circulation may be opened or closed therethrough.

When the by-pass connection is used with valve $15^c$ closed and valves $15^d$ open, circulation is forced by pump 31 through main pipe 15 at an increased pressure if desired, subject to control by the valves, whereby to positively effect the desired pressure on the several plungers 41.

By either supply, whether direct from the main or through the pump, the pressure will be ample to move the pistons against internal pressure on valve $24^d$ and spring 19.

A further advantage in the pump is that the pressure may be increased to any desired extent, independent of the presence of the choke nozzle 14, should it not be used.

Referring now to the electrical control system shown, this is preferably included in the installation and as a part of the system to facilitate and simplify the operation.

Referring to Fig. 10, R is the main supply switch, and H, K, L, M and N are single pole switches for opening and closing the circuit from main line $o$ to branch conductors $p$, $q$, $r$, $s$ and $t$.

Conductors $p$, $q$ and $r$ lead to one side of magnets 29, 40 and 39 respectively, with a common return line $u$ from magnets 29, 39 and 40. A ground connection $v$ connects common return line $u$ with tank A.

Conductor $s$ closes the circuit through an indicating lamp $L'$ to an electrode $x$ at any suitable level in tank A, to close the circuit when the brine water is at such level.

Conductor $t$ connects through indicator lamp $L^2$ with a similar electrode $y$ in the drain pipe 4, for short circuiting in the same way, due to the presence of brine water.

During softening, switch R is open, with all the other switches and all circuits open.

For back-washing, switches H and K are closed, energizing magnet 29, with current supply also to magnet 40. Magnet 29 will then lower its valve $a'$ as in Fig. 4, allowing pressure from line 15 to lift piston 41, opening port $21^h$.

Likewise coil 40 is energized, seating valves $24^b$ and $24^c$ on ports $21^c$ and $21^e$, as in Fig. 4. After sufficient back-washing is accomplished, switch K is opened, causing valves $24^b$ and $24^c$ to return by spring 19.

For salting, switches L, M and N are closed. Coil 39 being energized, closes port $a''$, and water pressure from line $15^a$ depresses plunger 41, opening port $21^b$ and closing port $21^a$, as in Fig. 5.

When lamp $L'$ lights up, indicating that the brine solution has reached the level of electrode $x$ in its downward movement, then the charge of brine will be sufficient, switch L is opened and the valve $a'$ will rise by spring $m$. This relieves pressure on piston 41, when spring 19 will re-seat valve $24^a$, closing port $24^b$ and opening port $21^a$, as in Fig. 6, for flushing.

Raw water will then pass by pipe $1^a$ ports $21^a$, $21^c$, and pipe 22 to tank A forcing out the brine solution ahead, and when it commences to run to the drain 4, electrode $y$ will close circuit through $t$ lighting lamp $L^2$. As soon as lamp $L^2$ goes out it indicates that all salt has been flushed out of the softening tank A.

Switches L, M and N are then opened, de-energizing magnet 29, seating valve $24^d$ on port $21^h$ and opening port $21^g$, as in Fig. 3, ready for resumption of softening.

The operation is therefore as follows:

In softening, all switches R, H, K, L, M and N are open, and the circulation of hard water is from supply pipe $1^a$ to chamber S, through port $21^a$, to chamber T, through port $21^c$, to pipe 22, to the top of softener A. Thence down through the zeolite to bottom, out pipe 23 to chamber V, through open port $21^e$, to chamber X, through port $21^g$, to chamber Y, and out by soft water delivery pipe 2 to the delivery system, as in Fig. 3.

In back-washing, hard water passes from main $1^a$ to chamber S, port $21^a$, chamber T, port $21^d$, chamber V, to pipe 23, and into the bottom of softener A. Thence upwardly therethrough and into the receiving terminal $22^c$, of pipe 22, and into chamber Z, thence through port $21^f$, chamber X, port $21^h$, chamber W, and to drain pipe 4, as in Fig. 4.

In salting, raw water from supply line $1^b$ induces flow of brine water from brine tank B through ejector 7 and pipe 3 to chamber U, by port $21^b$, chamber T, port $21^c$, chamber Z, and pipe 22 to the upper portion of softener A. Thence downwardly through the contents and from the bottom of pipe 23 to chamber V, port $21^e$, chamber X, port $21^h$, to drain pipe 4, as in Fig. 5.

In flushing, raw water enters chamber S by pipe $1^a$, then through open port $21^a$, chamber T, port $21^c$, to chamber Z and by pipe 22 to top of softener A. The raw water passes downwardly therethrough and out by pipe 23 to chamber V, port $21^e$, chamber X, port $21^h$, chamber W, to drain pipe 4, as in Fig. 6.

The foregoing description covers the normal operation of the apparatus with upward back-washing and downward salting, flushing, and softening through tank A.

If desired, the softening tank A may be so connected with the brine tank through the valve box 45 as to provide also for upward flow in softening, with the same upward back-washing and downward salting and flushing, as above described.

In Figs. 11 and 12, I show a modified arrangement of piping and valves for such alternative circulation, by opening and closing the proper valves.

Thus with pipes 22 and 23 connected to valve box 45 as described above, pipe 22 is branched upwardly and downwardly at $22^a$ and is provided with an upper and a lower control valve 50 and 51.

Likewise pipe 23 is branched upwardly and downwardly at $23^a$ and is provided with an upper and a lower control valve 52 and 53. Upper branch line of pipe 22 is connected at 54 with an upper branch line 55 of pipe 23 opening into the top of tank A, and lower branch line of pipe 23 is connected at 56 with a lower branch line 57 of pipe 22, and opens into the bottom of tank A.

By such arrangement the piping for either downward or upward circulation in softening, as indicated by the arrows, is as follows:

For downward softening, with upward back-washing and downward salting and flushing, valves 51 and 52 are closed, and valves 50 and 53 are opened, as in Fig. 11.

For upward softening, with the same upward back-washing and downward salting and flushing, valves 50 and 53 are closed and valves 51 and 52 are opened, as in Fig. 12.

It will be understood that upward back-washing is preferable in all cases, as downward back-washing tends to pack the softening material. Therefore if desired, either of such alternative circulations may be used, although it is ordinarily preferable to soften by downward circulation.

In Fig. 13 I show a modified construction of actuating mechanism for valve $24^a$ or $24^b$.

In place of the piston, a diaphragm $41^a$ is mounted in a casing $18^{a\prime}$ and connected with the valve stem 38, and provided with a retracting spring 19. Valve $a'$ of armature $a$ controls circulation between the reduced feed of fluid supply pipe $15^a$ and the relatively larger outlet to return pipe $15^b$ through the valve port $a''$ in the same manner as above described. By such construction compound valve 24ª controls circulation from brine pipe 3 or raw water pipe 1ª as before, while the diaphragm 41ª provides a fluid tight head against leakage.

The pipes 15ª and 15ᵇ may be connected as shown, with circulation ports of proper size formed in the head of the casing, with convenient mounting for the magnet. Such construction may also be adopted for the other upper magnet 40 or the lower magnet 29, as desired.

What I claim is:

1. In a water softening apparatus provided with a brine tank and a softening tank, circulation controlling valve mechanism therefor consisting of a valve box provided with a raw water supply conduit, a brine water supply conduit, a soft water delivery supply conduit, a waste conduit, a conduit connecting the valve box with the base of the softening tank, a conduit connecting the valve box with the top of the softening tank, a series of valves controlling circulation within the valve box through said conduits, pistons therefor, a fluid pressure supply and an exhaust conduit for each of said pistons, and an intervening valve controlling circulation to said pistons.

2. In a water softening apparatus provided with a brine tank and a softening tank, circulation controlling valve mechanism therefor consisting of a valve box provided with a raw water supply conduit, a brine water supply conduit, a soft water delivery supply conduit, a waste conduit, a conduit connecting the valve box with the base of the softening tank, a conduit connecting the valve box with the top of the softening tank, a series of valves controlling circulation within the valve box through said conduits, pistons therefor, a fluid pressure supply and an exhaust conduit for each of said pistons, and an intervening valve controlling circulation to said pistons provided with an operating magnet.

3. In a water softening apparatus provided with a brine tank and a softening tank, circulation controlling valve mechanism therefor consisting of a valve box provided with a raw water inlet conduit, a raw water conduit adapted to be connected to the softening tank, an intervening chamber having valve-controlled ports communicating with each raw water conduit, valves for each of said ports each having a piston, piston chambers therefor, a fluid connection to each of said chambers with an intervening valve-controlled port, and valves for said ports each having an actuating magnet.

4. In a water softening apparatus provided with a brine tank and a softening tank, circulation controlling valve mechanism therefor consisting of a valve box provided with a brine water inlet conduit, a brine water outlet conduit adapted to be connected to the softening tank, an intervening chamber having valve-controlled ports communicating with each brine water conduit, valves for each of said ports each having a piston, piston chambers therefor, a fluid connection to each of said chambers with an intervening valve controlled port, and valves for said ports each having an actuating magnet.

5. In a water softening apparatus provided with a brine tank and a softening tank, circulation controlling valve mechanism therefor consisting of a valve box provided with a soft water inlet conduit, a soft water outlet conduit, an intervening chamber having valve-controlled ports communicating with each soft water conduit, valves for each of said ports each having a piston, piston chambers therefor, a fluid connection to each of said chambers with an intervening valve controlled port, and valves for said ports each having an actuating magnet.

6. In a water softening apparatus provided with a softening tank, circulation controlling valve mechanism therefor consisting of a valve box provided with a raw water supply conduit and a back-washing conduit leading to the softening tank, an intervening chamber having valve controlled ports communicating with each conduit, valves for each of said ports each having a piston, piston chambers therefor, a fluid connection to each of said chambers with an intervening valve-controlled port, and valves for said ports each having an actuating magnet.

7. In a water softening apparatus provided with a softening tank, circulation controlling valve mechanism therefor consisting of a valve box provided with a return conduit from the softening tank and a drain outlet conduit, an intervening chamber having valve-controlled ports communicating with each conduit, valves for each of said ports each having a piston, piston chambers therefor, a fluid connection to each of said chambers with an intervening valve controlled port, and valves for said ports each having an actuating magnet.

In testimony whereof I hereunto affix my signature.

ANDREW J. DOTTERWEICH.